(12) United States Patent
Brown et al.

(10) Patent No.: US 8,719,369 B1
(45) Date of Patent: May 6, 2014

(54) CUSTOMIZED MESSAGE GENERATION

(76) Inventors: Brian Brown, Englewood, CO (US);
Chris Silveri, Centennial, CO (US);
Herman Lee, Highlands Ranch, CO (US)

(*) Notice: Subject to any disclaimer, the term of this patent is extended or adjusted under 35 U.S.C. 154(b) by 151 days.

(21) Appl. No.: 13/093,654

(22) Filed: Apr. 25, 2011

(51) Int. Cl.
*G06F 15/16* (2006.01)

(52) U.S. Cl.
USPC ............. 709/217; 379/88.16; 379/88.18; 379/88.22; 709/218

(58) Field of Classification Search
USPC .................. 709/213, 216, 217, 218, 219; 379/88.16, 88.18, 88.22, 88.26
See application file for complete search history.

(56) References Cited

U.S. PATENT DOCUMENTS

| | | | |
|---|---|---|---|
| 5,644,624 A | 7/1997 | Caldwell | |
| 5,657,246 A | 8/1997 | Hogan et al. | |
| 5,758,079 A | 5/1998 | Ludwig et al. | |
| 6,573,907 B1 | 6/2003 | Madrane | |
| 6,870,910 B1* | 3/2005 | Armstrong et al. | 379/88.22 |
| 6,959,322 B2 | 10/2005 | Ludwig et al. | |
| 7,142,645 B2 | 11/2006 | Lowe | |
| 7,185,054 B1 | 2/2007 | Ludwig et al. | |
| 7,206,390 B2* | 4/2007 | Smith et al. | 379/88.04 |
| 7,852,998 B1 | 12/2010 | Smith et al. | |
| 8,050,392 B2 | 11/2011 | Adams et al. | |
| 2002/0194142 A1* | 12/2002 | Coffey | 705/67 |
| 2004/0202293 A1* | 10/2004 | Pugliese | 379/88.01 |
| 2006/0055770 A1 | 3/2006 | Liu | |
| 2007/0121859 A1 | 5/2007 | Smelyansky et al. | |
| 2007/0140466 A1* | 6/2007 | Sharma | 379/235 |
| 2008/0187109 A1* | 8/2008 | Meng et al. | 379/88.01 |
| 2010/0260075 A1 | 10/2010 | Smith et al. | |
| 2011/0123016 A1* | 5/2011 | Segall et al. | 379/266.07 |
| 2011/0129081 A1* | 6/2011 | Segall | 379/266.07 |
| 2011/0182283 A1* | 7/2011 | Van Buren et al. | 370/352 |

* cited by examiner

*Primary Examiner* — Dhairya A Patel
(74) *Attorney, Agent, or Firm* — HolzerIPLaw, PC

(57) ABSTRACT

Implementations described and claimed herein provide a method comprising generating a plurality of prompts, each of the plurality of prompts related to one of a plurality of elements, generating an indexed prompt file (IPF) comprising one or more of the plurality of prompts and index information about the one or more of the plurality of prompts, and generating an IPF map file relating one or more of the elements to one or more of the plurality of prompts using the index information. The method further comprises mapping a target phone number to the one or more of the plurality of elements, the target phone number being associated with a target on a target list, generating a call to the target phone number, and playing the one or more of the plurality of prompts based on the index information.

27 Claims, 11 Drawing Sheets

| Identification | Map ID | Element | Key | Index | Duration | Approval Status | Comment |
|---|---|---|---|---|---|---|---|
| 1 | 1 | 1 | James | 0 | NULL | 1 | Hello James |
| 2 | 1 | 1 | John | 1 | NULL | 1 | Hello John |
| 3 | 1 | 1 | Robert | 2 | NULL | 0 | Hello Robert |
| 4 | 1 | 1 | Michael | 3 | NULL | 0 | Hello Michael |
| 5 | 1 | 1 | Mary | 4 | NULL | 0 | Hello Mary |
| 6 | 1 | 1 | William | 5 | NULL | 0 | Hello William |
| 7 | 1 | 1 | David | 6 | NULL | 1 | Hello David |
| 8 | 1 | 1 | Richard | 7 | NULL | 0 | Hello Richard |
| 9 | 1 | 1 | Charles | 8 | NULL | 0 | Hello Charles |
| 10 | 1 | 1 | Joseph | 9 | NULL | 1 | Hello Joseph |
| ... | ... | ... | ... | ... | ... | ... | ... |
| ... | ... | ... | ... | ... | ... | ... | ... |

FIG. 6

| Name | Map_id | Specification 1 | Specification 2 |
|---|---|---|---|
| cjtest1 | 1 | R,1; 0,17 | R,1;R,2;1,50,R;3 |
| acme chicago | 2 | R,1;R,2;R,4 | R,1 |

FIG. 9

CUSTOMIZED MESSAGE GENERATION

TECHNICAL FIELD

The present application is generally directed to an automated telephone call system and specifically to system and method for generating automated voice messages.

BACKGROUND

Generating a large number of customized and personalized outbound voice messages is a tedious task that requires substantial amount of manual processes including creating, communicating, and bookkeeping of a large number of sound files. It is also difficult to index such large number of sound files in a manner so that they can be used by a telephony system. Furthermore, using such a large number of sound files also makes it difficult to generate real-time outbound messages without considerable lag time between initiating a telephone connection with a target and delivering the sound file to the target. Thus, there is a need for a method and system that generates and deploys a large number of sound files in an efficient and effective manner.

SUMMARY

Implementations described and claimed herein provide a method comprising generating a plurality of prompts, each of the plurality of prompts related to one of a plurality of elements, generating an indexed prompt file (IPF) comprising one or more of the plurality of prompts and index information about the one or more of the plurality of prompts, and generating an IPF map file relating one or more of the plurality of elements to one or more of the plurality of prompts using the index information.

An implementation of the system disclosed herein further comprises generating a prompt script file including one or more prompt script specifications, each of the one or more prompt script specifications including a list of rules for generating an outgoing message. The system also comprises mapping a target phone number to the one or more of the plurality of elements, the target phone number being associated with a target on a target list, generating a call to the target phone number, and based on the response to the call, selecting one of the prompt script specifications. Subsequently, the system plays the one or more of the plurality of prompts based on the index information.

In one example implementation, mapping the target phone number to the one or more of the plurality of elements further comprises mapping a target name related to the target phone number to the one or more of the plurality of elements using the homophone of the target name. The plurality of elements include a first name element, and the method further comprises receiving parameters for the first name element, analyzing the parameters for the first name elements to determine a predicted coverage percentage, and selecting a subset of the parameters for the first name elements based on a threshold value for the predicted coverage percentage. In an alternative implementation, selecting the subset of the parameters for the first name elements further comprises comparing one or more of the parameters for the first name elements with their homophones.

An alternative implementation, generating a plurality of sound file further comprises generating a host script file including a list of parameters related to one or more of the plurality of elements, recording a master sound file containing one or more prompts related to the list of parameters, and dividing the master sound file into the plurality of prompts in the form of sound files. Alternatively, generating an IPF further comprises deleting one or more of the plurality of prompts after generating the IPF. In an alternate implementation, a zip file including the IPF file and the IPF map file is also generated.

In an alternative implementation generating the zip file further comprises converting at least one of the plurality of prompts into a pulse code modulated (PCM) format and normalizing the at least one of the plurality of prompts. The normalizing the at least one of the plurality of prompts further comprises normalizing at least one of (1) volume of the at least one of the plurality of prompts; (2) pitch of the at least one of the plurality of prompts; and (3) background noise of the at least one of the plurality of prompts.

In an alternative implementation, generating the prompt script file further comprises generating a plurality of map rule specifications, each of the plurality of map rule specifications including one or more pairs of elements and keys and generating one of more of the prompt script specifications including or more of the map rule specifications. In one implementation, the one or more prompt script specifications includes a prompt script specification for a live answer, a prompt script specification for music hold, and a prompt script specification for answering machine. Alternatively, the one or more prompt script specifications includes a prompt script specification for a message to be played at the end of the call as a "goodbye" message or a prompt script specification for a message to be played prompting the target for providing a feedback such as a voicemail message.

In an alternative implementation, the one or more of the plurality of elements are related to inviting the target to a live telephony event. An alternative implementation further comprises continuing the live telephony event with the target phone number after playing prompts related to the one or more of the plurality of elements related to inviting the target to a live telephony event. Yet alternatively, the one or more of the plurality of elements are individualized for the target based on the one or more fields associated with the target phone number. In one implementation, one of the one or more of the plurality of elements is an individualized survey for the target. In one implementation, generating the call further comprises generating the call before initiation of a live telephony event. In one implementation, at least one of the one or more of the plurality of elements is an individualized ending message for a target, wherein the individualized ending message is played at the end of a live telephony event.

An implementation of the method disclosed herein further comprises playing one or more sound files, wherein the one or more sound files are selected based on the individual information about the target. The one or more sound files are individualized invitation sound files inviting the target to a live telephony event. An implementation further comprises continuing the live telephony event at the end of playing the one or more sound files.

These and other features and advantages will be apparent from a reading of the following detailed description. Other implementations are also described and recited herein.

BRIEF DESCRIPTIONS OF THE DRAWINGS

A further understanding of the nature and advantages of the technology described herein may be realized by reference to the following figures, which are described in the remaining portion of the specification.

FIG. 6 illustrates the content of an example IPF map file.

FIG. 9 illustrates the content of an example prompt script file.

DETAILED DESCRIPTIONS

Implementations of the technology described herein are disclosed herein in the context of a customized message generation system. Reference will now be made in detail to implementations of the technology described herein as illustrated in the accompanying drawings and the following detailed description to refer to the same or like parts. Throughout the specification, the term "file" should mean a file like a Word document, a comma separated value (CSV) file, etc., and the term "table" should mean a table in a database.

Figure 1:
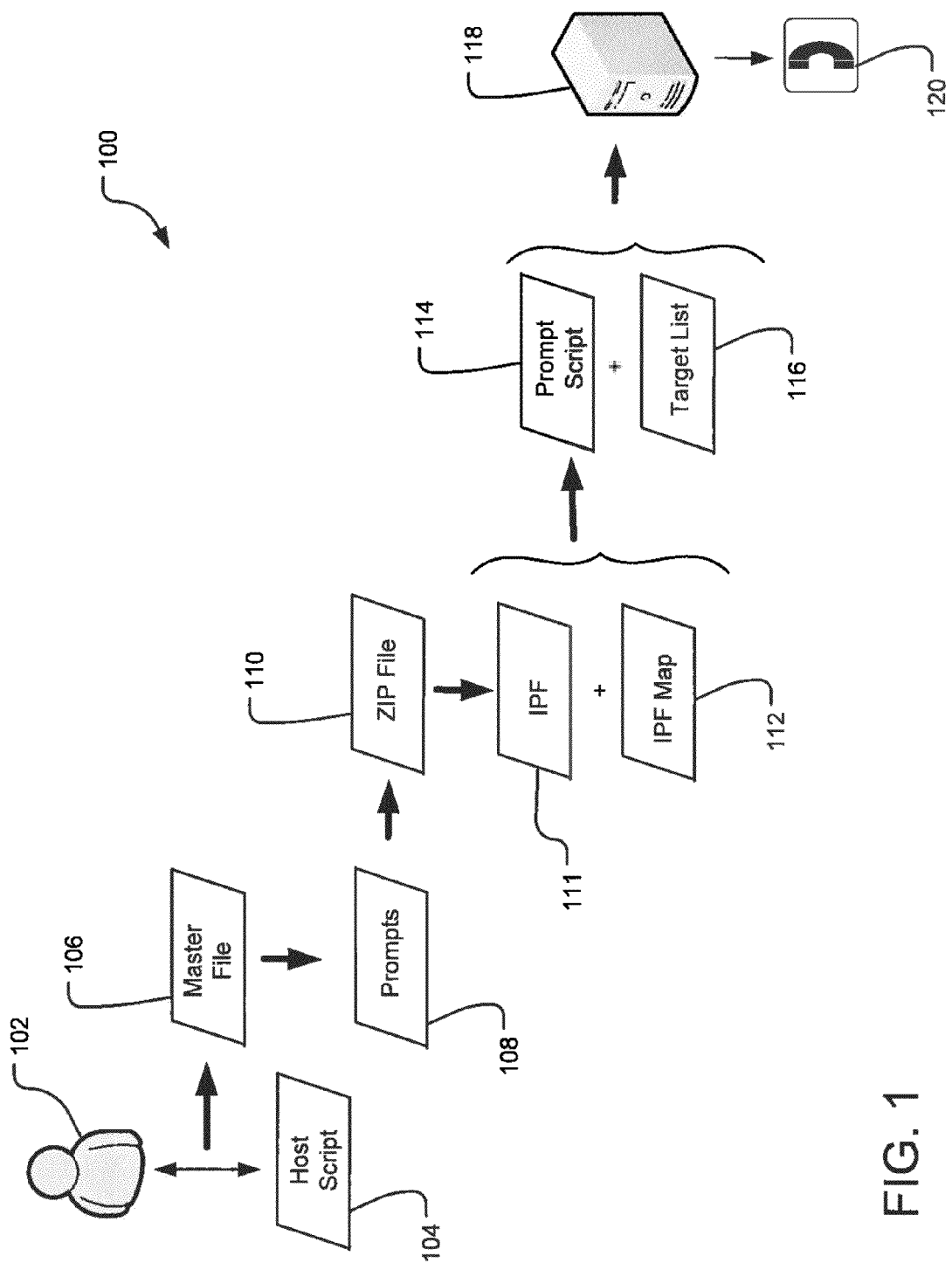
FIG. 1 illustrates an example data flow diagram of a system used to generate customized messages.

FIG. 1 illustrates an example data flow diagram of a system 100 used to generate customized messages. Specifically, the data flow diagram illustrates various selected stages, the inputs used by the selected stages, and the outputs generated by the selected stages of the system 100. One or more stages of the system 100, together with the inputs used by the stages, and the outputs generated by the stages are also described in further detail in FIGS. 2-12 below. Note that one or more stages prior to some of the stages described in FIG. 1 may also be required. However, for the benefit of clarity, FIG. 1 discloses only selected stages of the system 100.

As illustrated in the example data flow diagram of the system 100, a user 102 uses a host script 104 to generate an audio output file. The host script 104 is generated based on a preliminary list containing phone numbers, names, etc. Such a preliminary list may be provided by a client interested in generating an outbound call campaign. For example, such a preliminary list may be the same as a final target list used to generate outbound calls. The system 100 also generates a map file (also known as "seed list") containing mapping of rule identifications, element identifications, parameter values for various elements, and sound files for the parameter values. In one implementation, the host script 104 is a list of various parameter values for various elements. Table 1 below provides a partial list of the various elements in one example implementation of the system and method disclosed herein.

TABLE 1

| Element ID | Element Description |
|---|---|
| 1 | First Name |
| 2 | Last Name |
| 3 | City |
| 4 | Welcome |
| 5 | Invitation |

TABLE 1-continued

| Element ID | Element Description |
|---|---|
| 6 | Answering Machine |
| 7 | Music Hold |
| 8 | Goodbye |
| 9 | Invitation-Live |
| 10 | Invitation-AM |

For example, the element ID 1 represents first names attached to various target phone numbers called by the system 100, and the element ID 4 represents a welcome message to be played to various target phone numbers called by the system 100, etc. In one implementation, the parameter value of the element ID 1 is concatenated with a salutation, such as "hello," etc. Thus, for example an entry for first name John in the host script file 104 is "Hello John." The list disclosed above is only a partial list and in an alternative implementation, other elements, such as a Host Introduction element, a Contact Information element, etc., are also included in the host script file 104. Whereas some of the elements listed in Table 1 may have more than one parameter value, some of the other elements may have only one parameter value. For example, "Hello John" and "Hello Mary" are two sound files, but both belong to the same element 1, "First Name". On the other hand, element 9, "Invitation-Live" and element 10, "Invitation-AM" corresponds to only one sound file respectively. In one implementation, elements that are related to other messages for target individuals are also provided. One or more of such elements are customized for a specific characteristic of a target. For example, one such element is a target question for health issues for male target population; and such an element is eventually mapped to a target having male characteristic for its gender. Other such element is a target message for politically conservative target. Examples of other such elements include an invitation for one of a mass telephony event, a targeted tele-forum, a targeted telephone town-hall meeting, a targeted conference call, etc. Other examples of such elements also include targeted closing messages that are customized for a specific characteristic of a target. In one implementation, the user 102 records the entire content of the host script 104 in a single audio master file 106. However, alternative implementations generate more than one audio master files 106. For example, if the host script 104 contains a long list of parameters for various elements, the user 102, may have to take a break in recording, resulting in generation of more than one audio master files 106.

Subsequently, the system 100 generates a plurality of prompts 108 from the one or more master audio files 106. In one implementation, the system 100 divides the one or more audio master files 106 into the plurality of prompts 108 such that each of the plurality of prompts 108 contains audio recording of a single instance of a parameter value related to an element. For example, one of the audio files 108 is the recording of "Hello John," which is a parameter value for the First Name element. Similarly, another of the prompts 108 is the recording of "goodbye," which is a parameter value for the Goodbye element. In an implementation of the system 100, the prompts 108 are in the form of waveform audio files (WAV file). However, in alternative implementation, the system 100 uses other audio file formats such as MP3 file format, WMA file format, etc. In yet alternative implementation, the user 102 records the master files 106 in a video format with sound and subsequently the audio portion of the mater file 106 is stripped off and divided into the prompts 108.

Subsequently, the system 100 generates an indexed prompt file (IPF) and an IPF map. In one implementation, the IPF map is a table in a database, and it is generated based on the map file, wherein such a map file includes mapping of rule identifications, element identifications, parameter values for various elements, and sound files for the parameter values. In one implementation, the IPF includes one or more of the plurality of prompts 108 and prompt index information, including one or more sub-headers containing information about one or more of the plurality of prompts 108, much like a musical Compact Disc typically consists of many separate music tracks of varying lengths. For example, such sub-header information includes offset information about each of the prompts 108, length information about each of the prompts 108, etc. In one implementation, the offset and length information is in terms of bytes, however, alternative offset and length information format are also employed. A main header provides information about the number of prompts in the IPF, total size of the IPF, etc. The IPF map provides information that can be used to relate one or more parameter values (such as first name "John", last name "Smith", etc.) to one or more of the prompts in the IPF. In one implementation, the IPF map is provided in the form of a table in a database, wherein the table has a number of entries, each entry including a parameter value, index information about the parameter value, the duration of the prompt related to the element, etc. In one implementation, the system 100 generates a ZIP file 110 that includes sound files for the plurality of prompts and the map file, and a CSV file containing a mapping from an "element" & "parameter value" pair to a prompt name. Subsequently, the system 100 uploads the ZIP file 110 and converts it into an IPF 111 and an IPF map 112. The IPF map 112 may in the form of a table in a database.

Subsequently, the system 100 generates a prompt script 114 using the IPF map 112. In one implementation, the specifications of the mapping rules of the IPF map 112 provide mapping of one or more elements for an outgoing voice message in view of available information. For example, a mapping rule, Rule 1, of "1, −1; 2, −1; 1, 0" specifies following sequence for generating an outgoing voice message:

1, −1: Look up element ID 1 (first name), if not found→
2, −1: Look up element ID 2 (last name), if not found→
1, 0: Look up "first name, default value," which, in this case is, "Hello."

The system 100 generates a prompt script 114 using the IPF map 112. The prompt script 114 provides a sequence of sound bites that are played when making a phone call. In one implementation, the prompt script is provided in the form of a table with a series of prompt script specifications for each prompt script. Each of the prompt script specifications provides a series of customizable or non-customizable part of outgoing messages. In one implementation, each customizable part of the prompt script specifications refers to one of map rules, which are part of the prompt script 114. Thus, for example, a particular prompt script specification for a live answer is listed as "R, 1; 17, 0." This prompt script specification specifies using Rule 1 followed by element ID 17 for a live answer. A specification for answering machine that is provided as "R, 1; 18, 0" specifies using Rule 1 followed by Rule 2, followed by an element ID 18.

The system 100 takes the prompt script 114 and uses it with a target list 116 to generate voice messages for one or more of the targets from the target list 116. In one implementation, the target list provides a list of target phone number together with a number of identifying information about the target phone number, such as the first name of the target, last name of the target, city of the target, etc. The outbound call generation system 118, such as a computer telephony system or an interactive voice response (IVR) system, uses the prompt script 114 and the target list 116 to generate the specifications of the IPF segments that comprise the outbound messages. Subsequently, such outbound messages are used by the outbound call generation system 118 to play the outbound messages to the target phones 120.

As an example, suppose that one of the entries in the target list 116 is "John Smith" and when the outbound call generation system 118 calls that number, it recognizes that it has an answering machine on the target phone 120. In this case, based on an answering machine specification of "R, 1; 18, 0," the outbound call generation system 118 determines that it needs to look up mapping Rule 1, followed by element 15. Rule 1, as discussed above, is "1, −1; 2, −1; 1, 0." In this case, the outbound call generation system 118 first verifies if it has a prompt for first name "John." If such a prompt is found, the system 100 gets the index information (offset, duration, etc.) of "Hello John" in the IPF. Subsequently the system 100 gets index information for element 15 in the IPF 111, which may be a non-customizable message, such as for example, "this is Senator Jefferson calling you about the upcoming fund rally in your city." Subsequently, the outbound call generation system 118 plays the identified prompts in a sequence to generate a continuous sounding "Hello John, this is Senator Jefferson calling you about the upcoming fund rally in your city" message on target phone 120. In one implementation, the call generation system 118 consists of two components. The first being the one for translating the prompt script specifications (for example, one specification for live answer and one specification for answering machine, etc.) into sequences of prompts (sound files) and the second component being the one that actually dials target phone numbers and detects live answer or answering machine and plays the corresponding message (series of prompts). In one implementation, the looking up of the prompts' index information is done prior to attempting to call any of the targets, such that by the time the targets are contacted, the prompts can be played in sequence with no noticeable delay recognized by the target. Doing such preprocessing prior to generation of an outbound phone call allows efficient delivery of the series of prompts without any noticeable break between the prompts on part of the target. However, in an alternative implementation, the looking up of the prompts' index information is done in real time in a manner such that the prompts can be played in sequence with no noticeable delay recognized by a live person.

Figure 2:
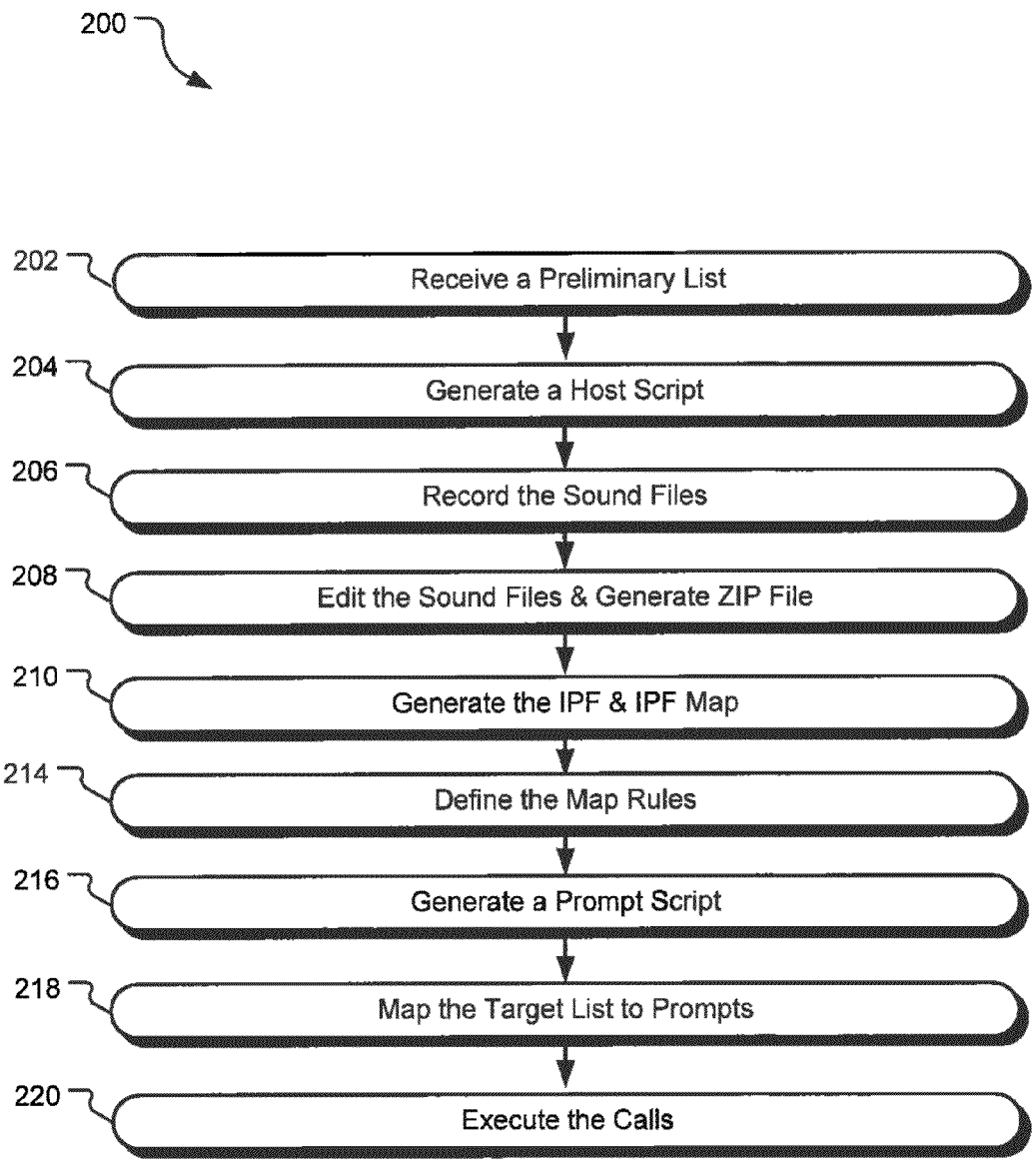
FIG. 2 illustrates the example operations for generating customized messages.

FIG. 2 illustrates the example operations 200 for generating customized messages. A generating operation 202 receives a preliminary list of parameters for various elements. Such a preliminary list may be provided by a client and in one implementation, the preliminary list may be the same as a target list used for generating outbound calls. In one implementation, the preliminary list is in the form of a CSV file with multiple columns, such as first name, last name, city, etc. Each column can potentially correspond to an element. For example, the first name column includes a list of first names, such as John, Bob, James, Mary, etc., wherein each of these names represent a parameter value for a "first name" element. Subsequently, based on this preliminary list, a generating operation 204 generates a host script. In one implementation, the operation 204 determines a selection of first names and last names to be near the top of the host script. Such selection of top first names and last names in disclosed in further detail in FIG. 3 below. In one implementation, the host script is a comma separated values (CSV) file that includes a table containing a number of prompts, which are related to the parameter values from the preliminary list. Additionally, the host script also includes prompts that are used to recalibrate the tone of a user that reads these scripts.

During a recording operation 206, a user records one or more of the prompts from the host script file. For example, if the host script is for a candidate running for congress to generate messages to a number of target constituents, the candidate may herself read the prompts in the host script file. In one implementation, the recording performed by the candidate results in a small number of large sound files. The candidate may also record the entire prompt script in just one large WAV file. An editing operation 208 edits the sound file or files. In one implementation, the editing operation involves dividing portions of the sound files generated during recoding operation 206 into a large number of smaller sound files with each of such large number of smaller sound files corresponding to a parameter value of an element.

Thus, in one implementation, the editing operation 208 creates an individual sound file for "Hello John," an individual sound file for "Hello Mary," etc. If the editing operation 208 determines that sound files related to one or more elements are of poor quality it may decide that either such sound files need to be rerecorded or in the least they should not be used in generating outbound messages. In one implementation, the editing operation 208 combines all the prompts into one indexed prompt file (IPF). The IPF also includes header information about the IPF and a number of sub-headers, each sub-header providing information about the offset of the prompts in the IPF. In one implementation, a graphical user interface (GUI) for IPF manipulation allows a user to keep, remove, or replace one or more prompts and automatically regenerate the IPF with new header and sub-header with offset information.

The editing operation 208 also generates a ZIP file containing the plurality of prompts and the map file, and a CSV file containing a mapping from an "element" & "parameter value" pair to a prompt name. The editing operation uploads the ZIP file for further processing. Subsequently a mapping operation 210 generates an IPF and an IPF map based on the content of the ZIP file. In one implementation, the IPF map is in the form of a table in a database that contains mapping information about various elements. For example, an entry in the IPF map provides the index and the contents of a prompt in the IPF related to a parameter value for a particular element. Additional information, such as whether the prompt for the particular parameter value is approved or not, a comment, etc., are also provided. Subsequently, a generating operation 212 generates a ZIP file using the IPF and the IPF map file. A GUI may be used to change the format of the prompts, normalize the prompts by increasing and/or decreasing the volume of the prompts, the pitch of the prompts, the background noise for the prompts, etc. In one implementation, such normalizing of the prompts is used to achieve a consistent and pre-determined volume level for all prompts. For example, such a GUI allows converting the prompts from WAV format to PCM format or to other formats. The GUI also allows raising or lowering the volume (and therefore, in some cases, quality) of the prompts.

Subsequently, a defining operation 214 defines map rules for the prompt script. Such rules specify how to play back the customizable parts of the voice messages. In one implementation, the map rules are defined by a user. In one implementation, the specifications of the mapping rules 112 provide mapping of one or more elements for an outgoing voice message in view of available information. For example, a mapping rule, Rule 1, of "1, −1; 2, −1; 1, 0" specifies following sequence for generating an outgoing voice message:

1, −1: Look up element ID 1 (first name), if not found→
2, −1: Look up element ID 2 (last name), if not found→
1, 0: Look up "first name, default value," which, in this case is, "Hello."

Subsequently, a generating operation 216 uses the IPF, the IPF map, and the map rules to generate a prompt script. A prompt script is a machine-readable directive instructing a computer how to play a sequence of prompts for a particular outgoing message. A prompt script provides a sequence of prompts that are to be played when making a phone call. In one implementation, the prompt script is provided in the form of a table with a series of specifications for each call disposition (live answer or answering machine). Each of the prompt script specifications provides a series of customizable or non-customizable parts of outgoing messages.

Subsequently, a mapping operation 218 maps a target list to prompts using the prompt script. In one implementation, the target list (which can be the same file as the preliminary list file, or at least in the same format and provide the same set of information as the prelimary list.) provides a list of target phone number together with a set of identifying information about the phone number, such as the first name of the target, last name of the target, city of target, etc. Specifically, the mapping operation 218 takes the prompt script and uses it with a target list to generate a sequence of outbound voice messages for each of one or more of the targets from the target list. During a calling operation 220, an outbound call generation system such as a computer telephony system or an interactive voice response (IVR) system uses the target list and corresponding sequence of outbound messages to generate outbound messages to the target phones 120.

Figure 3:
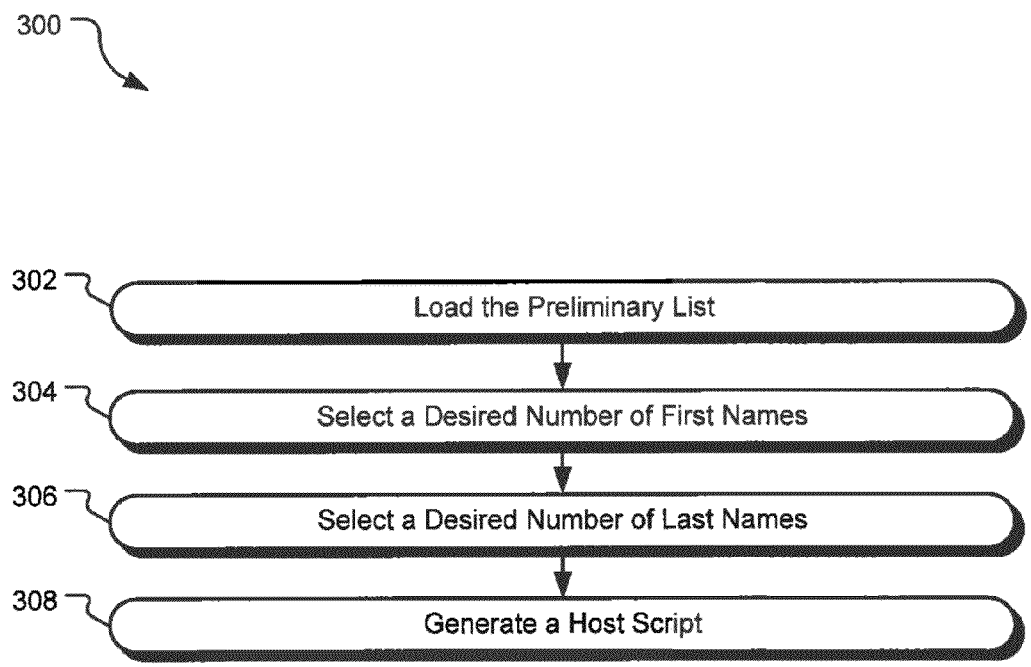
FIG. 3 illustrates the example operations for generating a host script from a preliminary list of names.

FIG. 3 illustrates the example operations 300 for generating a host script from a preliminary list of names. A host script consists of a series of explicit voice prompts to be read, word-for-word, in order and logically separated, by the person recording the prompts. For example, a trivially simple host script may contain two lines: "Hello John" and "Hello there". In this case, the "host" is being instructed to read exactly these two phrases, logically separated either by putting them into separate files, or by leaving space between them: "Hello John. <5 second pause> Hello there". In one implementation, a user uses a GUI to perform various operations for generating the host script. A loading operation 302 loads a preliminary list. In one implementation, the preliminary list includes a large number of first names and last names. An example list includes 563 unique first names and 363 unique last names. In general, such a preliminary list includes a universe of first names and last names that provides nearly complete set of first names and last names expected in a target population. Subsequently, a selecting operation 304 selects the desired number of first names to include in the host script. A second selecting operation 306 selects the desired number of first names to include in the host script. In one implementation, the selection of the first name or the last name to be included in the host script may be dependent on one or more demographic characteristic of the target population. For example, if the target population in expected to be predominantly of Chinese ethnicity, the last name will be selected first as the last names tend to have more commonality and first names tend to be more unique. Similarly, if the target population in expected to be predominantly of Hispanic ethnicity, last names will be selected before first names sometimes, while in other cases first names will be selected before last names.

Together the selecting operations 304 and 306 allow a user to determine how many entries are to be included in the host script file. A large number of entries would result in delivering a large portion of the target population a personalized message. However, to record audio files for such a large number of entries is often time consuming. Generally, as the number of entries increases, there is a diminishing rate of return in terms of hitting larger coverage percentage of the target population with personalized messages. For example, it is often possible to select only top (or most likely) 200 first names and top 100 last names and hit almost three quarter of any target population (on average) with personalized messages. A GUI allows a user to interactively select different combinations for the number of first names and last names to facilitate making a decision.

Subsequently, a generating operation 308 generates a host script based on the selections made by the user. In one implementation, the generating operation 308 also considers homophones for various common names or the names on the list that are in the selected section. Thus, for example, if there is an entry for "Chris" and "Kris" as part of the selected entries, the generating operation would select only one of the two entries to be recorded. If an entry on the target list is "Kris," the system 100 ensures that it is mapped to the offset of the prompt that is related to first name "Chris."

Figure 4:
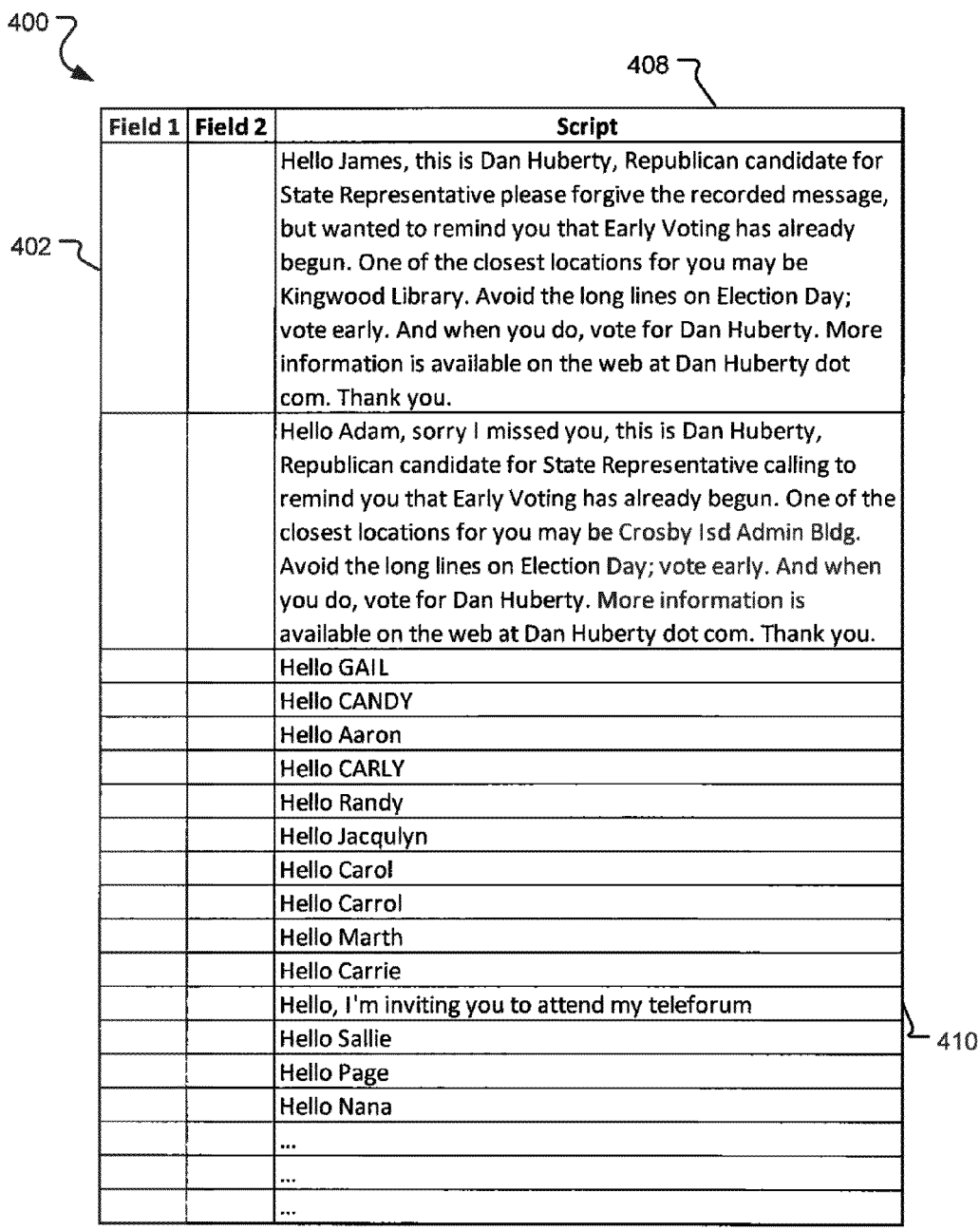
FIG. 4 illustrates the content of an example host script file.

FIG. 4 illustrates the content of an example host script file 400. In one implementation, the host script file 400 is in the form of a table in a database. Alternatively, the host script file 400 is in the form of a CSV file. Specifically, FIG. 4 illustrates selected fields of a host script table 402 including a script field 408. The host script table 402 may also include other fields (field1, field2, etc.).

Once the host script file 400 is generated, it is given to a person whose voice is used to generate the outbound messages. For example, if a political candidate John Smith is interested in generating outbound messages for a number of people, John Smith will record the reading of one or more lines of the host script table 402. The host script table 402 also includes one or more recalibration scripts that are used to recalibrate the voice tone of the person recording one or more lines of the host script table 402. An example of such a recalibration script 410 is a longer script that breaks the monotony of reading a series of small and similar sounding scripts (from number 3 to number 12). In one implementation, candidate John Smith records reading of all the scripts from the host script table 402 in one master audio file, however, he can also record the scripts in more than one audio file.

Figure 5:
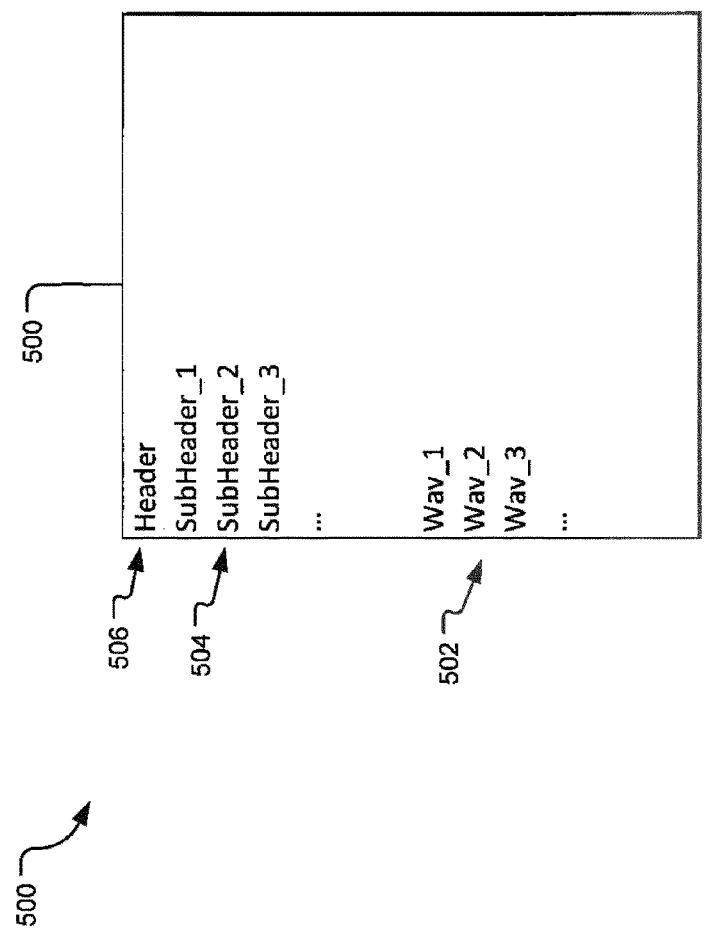
FIG. 5 illustrates the content of an example indexed prompt file (IPF).

FIG. 5 illustrates the content of an example indexed prompt file (IPF) 500. The IPF 500 includes a number of prompts 502, including Wav_1, Wav_2, etc. Each of the prompts is a recorded sound bite related to one of the elements, such as "Hello," "Hello John," "Goodbye", etc. The sub-headers 504 provide information about the prompts 502, such as the duration of the prompts 502, the byte offset from the beginning of the file where the prompts are located 502, etc. Thus, for example, Subheader_1 provides the offset and length of prompt 1 in terms of bytes. In alternative implementations, the sub-headers 504 also provide additional data about the prompts 502. The header 506 contains aggregate information about the IPF 500, such as how many prompts 502 are in the IPF 500, etc.

FIG. 6 illustrates the content of an example IPF map file 600. In one implementation, the IPF map file 600 is implemented as an IPF map table 602 in a database. The IPF table 602 includes various fields 604-618 wherein each record in the IPF map table 602 provides information about a particular prompt in an IPF file. Specifically, the identification field 604 provides a unique identification for each record of the IPF map table 602. A map ID field 606 identified in the IPF map. An element ID field 608 identifies the element, such as first name (element ID=1), last name (element ID=2), etc. A key field 610 contains the parameter values. An index field 612 provides index information about the prompt in the IPF.

A duration field 614 provides length of the way file in the IPF related to the particular record. Additionally, in one implementation, an approval field 616 gives information about approval status of the way file related to the particular record. Similarly, a comment field 618 provides any comments as necessary. While table 602 lists only selected fields of the IPF map file 600, alternative implementation includes one or more additional fields with information about way files. For example, information about offset of each of the way file in the IPF, information about offset of the sub-header identifying the way files is also provided.

Figure 7:
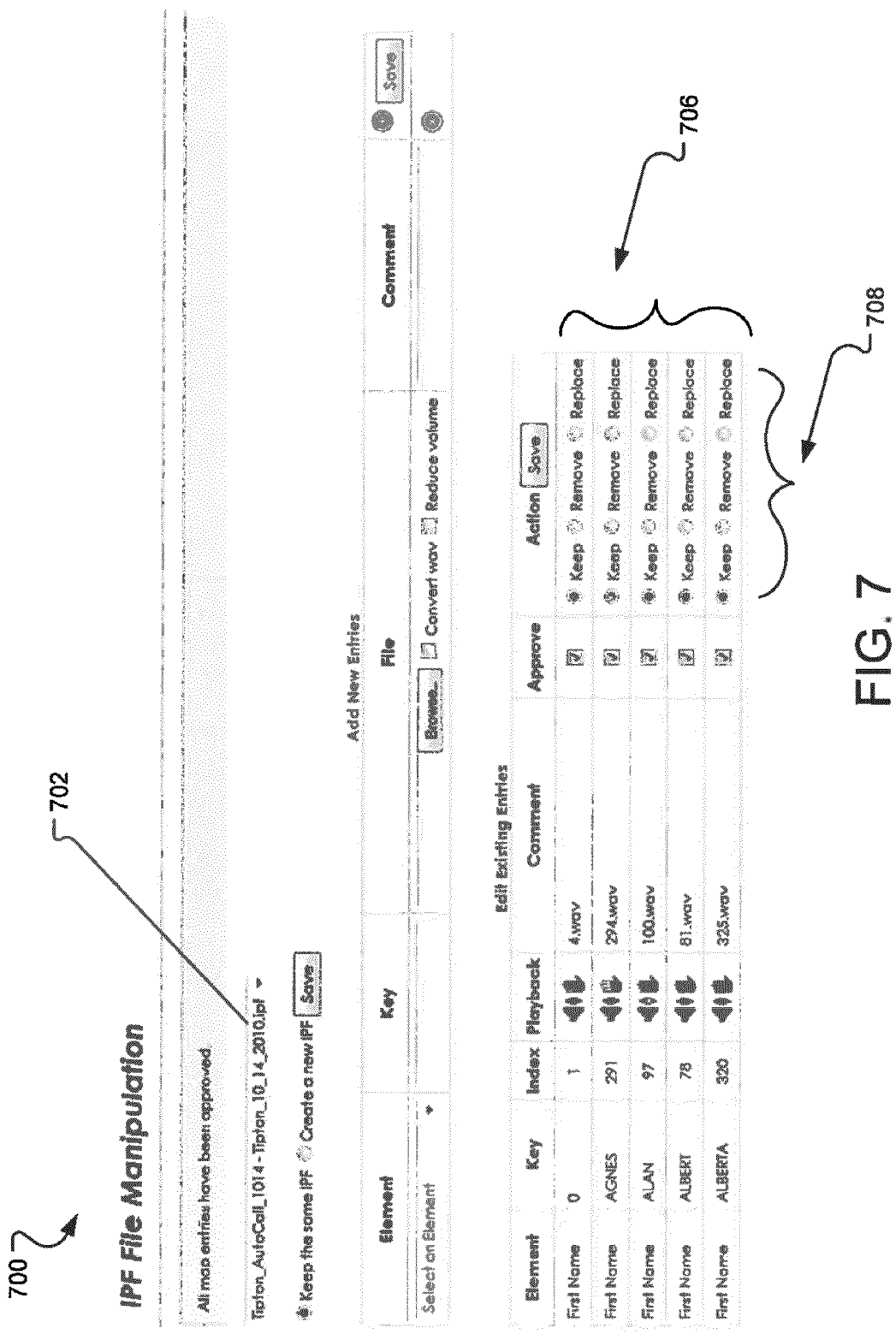
FIG. 7 illustrates a screen shot for an example graphical user interface (GUI) used for revising the IPF.

FIG. 7 is a screen shot for an example graphical user interface (GUI) 700 used for revising an IPF. The GUI 700 allows a user to select an IPF using a drop down menu 702. Once the IPF is selected, a plurality of the prompts in the IPF 706 will be displayed and can be edited or revised. A user can also add a new prompt to the IPF along with a comment for that prompt.

Additionally, a user is able to listen to a prompt by selecting a playback button, approve a prompt by checking an approval box, and add a comment for the prompt. In addition, a selection of action buttons 708 allows a user to keep, remove or replace a prompt in the IPF. Once the user has reviewed and edited the prompts as necessary, the revised IPF can be saved by selecting the save button. Additionally, the GUI 700 also provides a user an option to convert a prompt to a different format (for example, from a WAV file to a PCM file and vice-versa) and to reduce the volume.

Figure 8:
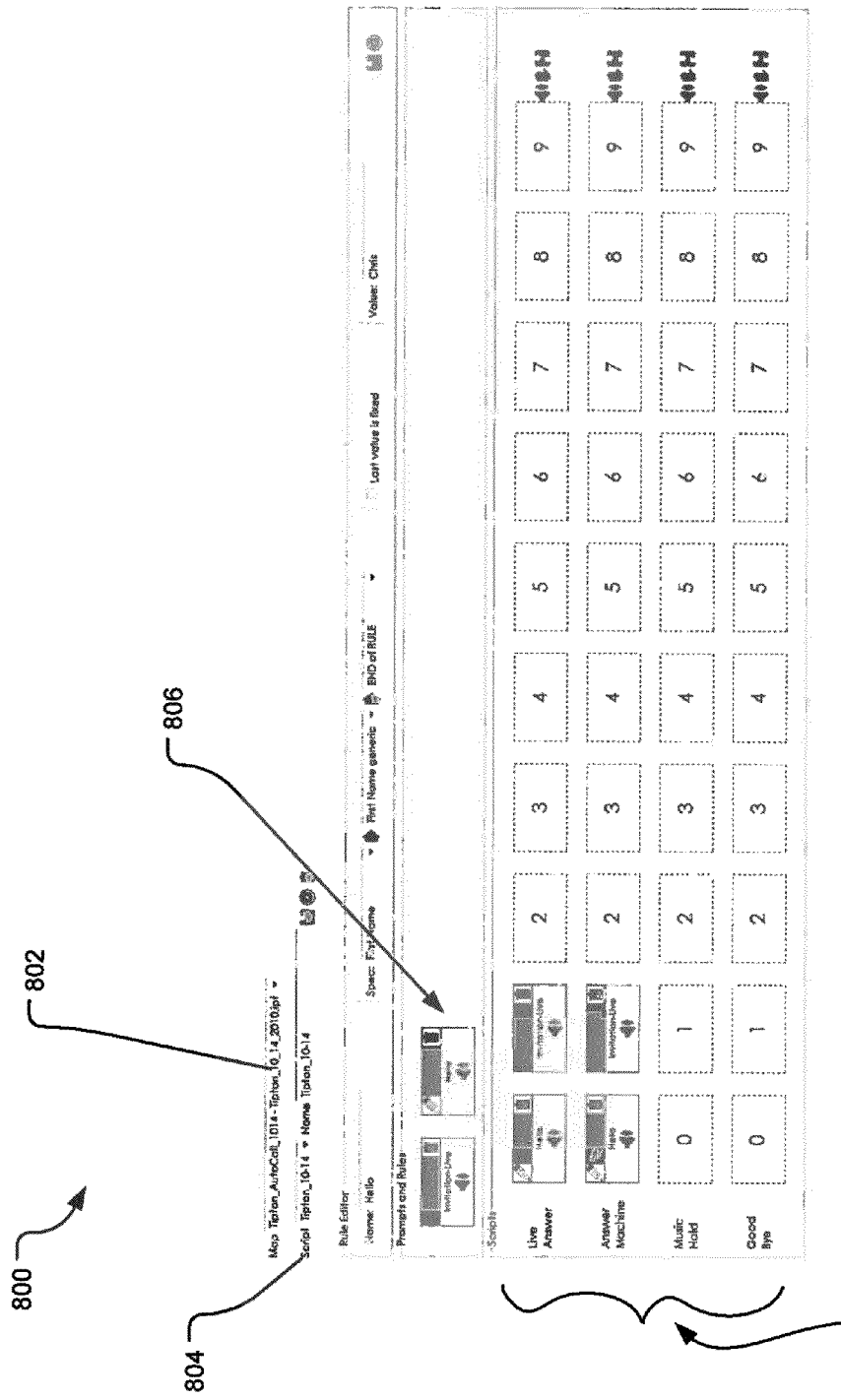
FIG. 8 illustrates an example GUI for creating a prompt script file.

FIG. 8 illustrates an example graphical user interface (GUI) 800 for creating a prompt script file. The GUI 800 allows a user to create one or more script specifications for a prompt script by combining a plurality of prompts (non-customizable parts of the script) and/or rules (customizable parts of the script). As illustrated in FIG. 8, a user selects an IPF file using a drop down menu 802 and selects a prompt script name using a drop down menu 804. After the selection of the IPF file and the prompt script name, the GUI 800 provides a list of graphical icons for prompts and rules 806 that are used for building the prompt script specification.

The GUI 800 allows a user to drag and drop the icons related to the prompts and rules 806 into one of the prompt script specifications 808. For example, as illustrated in FIG. 8, a user is able to create four different prompt script specifications, namely, a "Live Answer" specification, an "Answering Machine" specification, a "Music Hold" specification, and a "Good Bye" specification. Once a user has selected the series of prompts and rules icons for a given specification, the user can play the entire sequence for each prompt specification using the play button provided by the GUI 800 and/or save the prompt specification using the save button.

Figure 9:
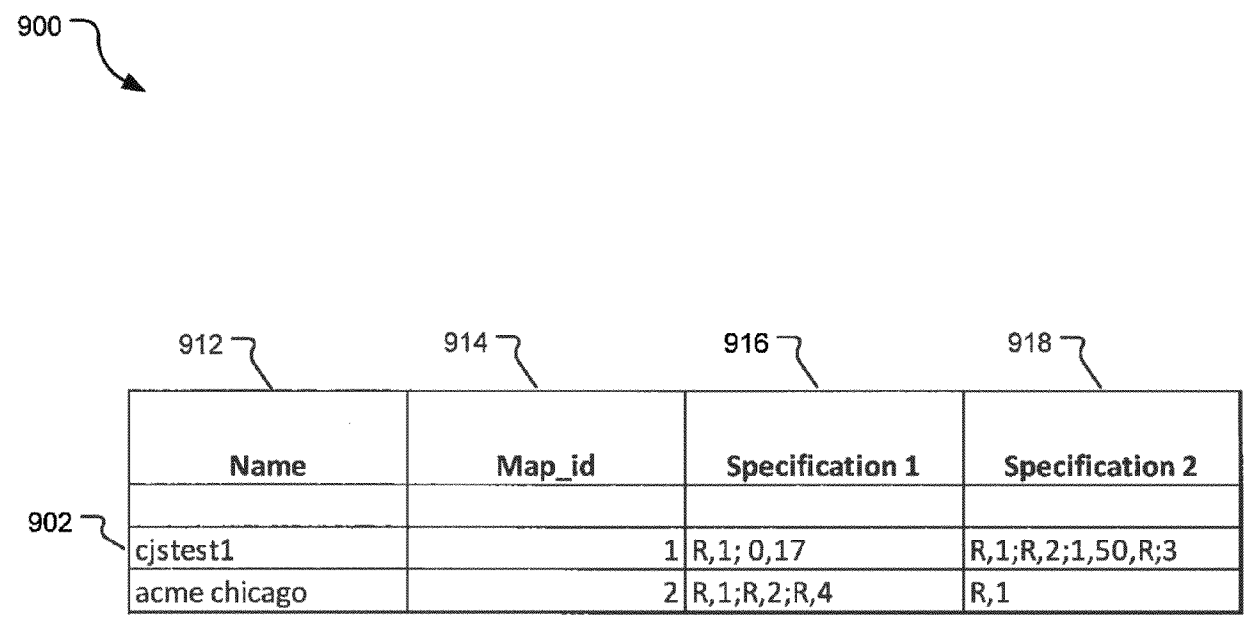

FIG. 9 illustrates the content of an example prompt script file 900. Specifically, FIG. 9 illustrates selected fields for two records of a prompt script table 902. Each of the records is a prompt script that provides a sequence of sound bites. The Name field 912 is the name of a particular prompt script and the map ID field 914 is an identification for the IPF map. The prompt script specifications 916 and 918 for a particular prompt script identify which prompts are to be played in which particular circumstances.

In the example illustrated in FIG. 9, the specification 1 916 is a prompt script specification for a live answer and the specification 2 918 is a prompt script specification for answering machine. Each specification entry includes a list of rules (as specified by R) and one or more non-customizable sound bites. For example, for prompt script specification 1 916, the entry "R, 1; 0, 17" specifies that for live answer in response to a telephone call, follow Rule 1 followed by key 0 for the element 17. Here Rule 1 may specify looking up a sound file for a first name, if first name is not available, looking up a sound file for a last name, and if last name is not available, looking up a sound file for "Hello." Following the sound bite (the end-result of a rule is a single sound bite, e.g. "Hello John" or "Hello Smith family" or just "Hello") identified by Rule 1 may be a message inviting a person to a town hall meeting (as specified by key 0 for element 17.

Figure 10:
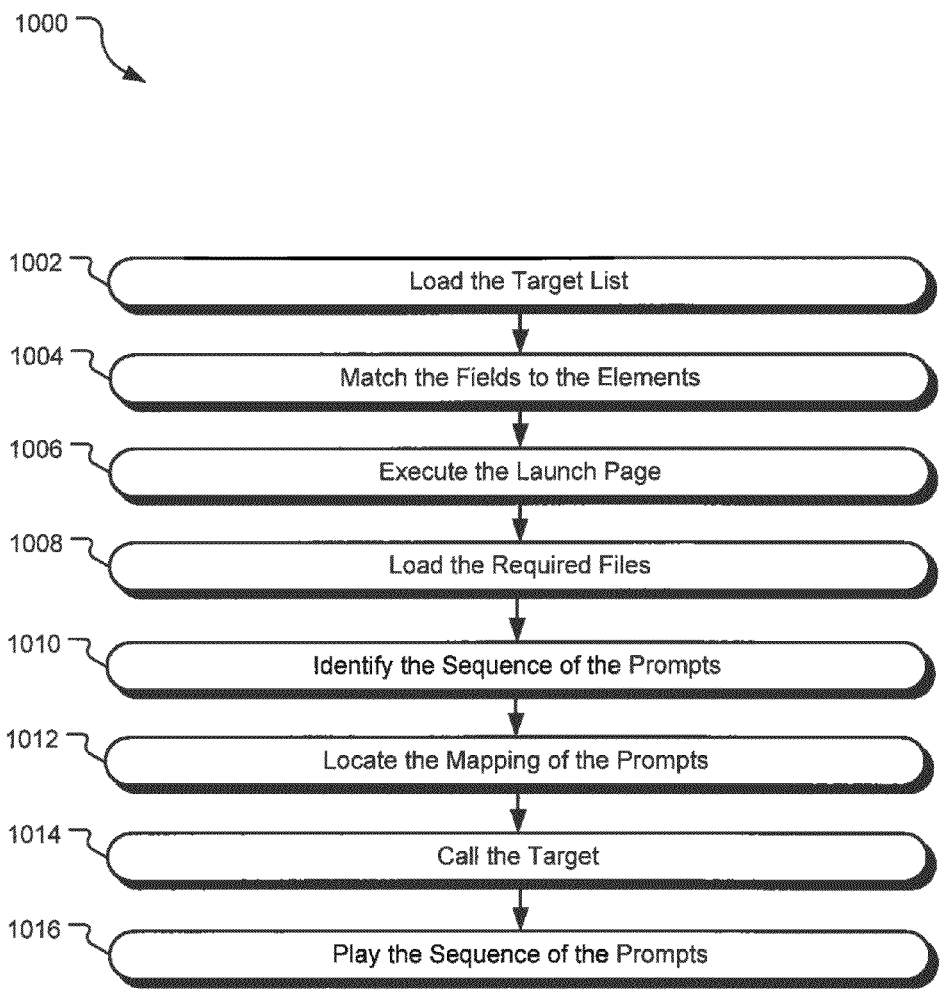
FIG. 10 illustrates the example operations of generating specifications for outbound calls.

FIG. 10 illustrates the example operations for selecting a combination of prompts for a given target/outbound call. A loading operation 1002 loads a target list that provides a list of target records. Each target record may include a number of fields related to a target, such as a phone number, a first name, a last name, city, etc. A matching operation 1004 matches the fields of the target list to the elements. Thus, for example, a target field with a first name is matched to the first name element, etc. In one implementation, each of the target record also includes other characteristic information about an individual target, such as the target's home address, work address, gender, age, occupation, political affiliation, buying habits, etc. Other such other characteristic information about an individual target also includes the target's status as a previous customer, a constituent, etc.

Subsequently, an executing operation 1006 executes a launch page specifying the target list and the prompt script specifications for the particular campaign. Thus, for example, the executing operation specifies the target list to be used with a prompt script ID "acme_chicago." This allows the system to determine the series of prompt script specifications from the prompt script file that are related to prompt script ID "acme_chicago." In one implementation of the system disclosed herein, the information about a target individual is used to customize one or more messages delivered to such the target individual. For example, in one implementation, the information about a target individual is used to invite the target individual to answer questions about a targeted survey. In such an implementation, the executing operation 1006 takes into account information about one or more characteristics about the target to determine the prompt script specifications. Thus, for example, if it is determined that a target individual's gender is male, that target individual may be provided questions and/or messages about health issues for a male target population. In such a case, a prompt specification that includes an element with such questions about health issues for male target population is selected. On the other hand, if another target individual's gender is female, that target individual is provided questions about health issues for female population.

In yet alternative implementation, information about a target individual is used to invite the target individual to a targeted mass telephony event, a targeted tele-forum, a targeted telephone town-hall meeting, a targeted conference call, etc. For example, if a record for a target individual identifies that individual as a conservative leaning female, an appropriate prompt specification including an element that relates to an invitation for a targeted conference call for conservative female population is specified. In one implementation, the executing operation 1006 specifies a sequence of prompts to be played before a live teleconferences, tele-forum, etc. An additional sequence of operations to be played after such live event may also be specified.

Alternately, individual prompts from the IPF file are used together with a teleconference, a tele-forum, etc. For example, a personalized message for a target that is to be played at the end of a teleconference is specified based on one or more characteristic information from the target record. If the target record specifies that the name of the target is "John," a prompt from the IPF that relates to "thank you John," is selected to be played at the end of a teleconference. Note that such a teleconference may be a live telephony event or a pre-recorded telephony event. Thus, the operations of FIG. 10 allow a combination of live messages with pre-recorded messages to be delivered to a target in various orders. For example, in a particular sequence for a target record that identifies the first name of the target as Mary and the occupation of the target as a teacher, and the city as Denver, a sequence including a prompt for "Hello Mary," followed by a prompt with a personalized message for teachers in Denver, followed by a prompt for "goodbye Mary," is delivered to the phone number for the target in case of a live person picking up the phone. An alternative sequence may be delivered in case of an answering machine or music hold.

As a result of the various operations described above, all of the prompts for specific outgoing calls are resolved. Subsequently, a loading operation 1008 loads the mapping information as specified by each of the prompt script specifications for the prompt script ID "acme_chicago." For example, if there are three prompt script specifications (live answer, answering machine, and good-bye) specified for the prompt script ID "acme_chicago," the loading operation reviews each of the specifications and loads the required mapping information for each element identified by each prompt script specifications. Thus, if the target list has first names "John" and "Mary," and last names "Smith," and "Jones," mapping information for each prompt "John," "Mary," "Smith," and "Jones" is loaded. Furthermore, if one of the prompt script specifications requires a prompt for an element that is non-customizable (such as, for example, a prompt for "please attend the rally at the freedom plaza"), the loading operation also loads the mapping information for such a prompt. In addition, the loading operation also loads a file with homophone listing and identifies substitute prompts for one or more instances of first name, last name. etc., on the target list.

Subsequently, an identifying operation 1010 identifies the sequence of prompts to be played for each of the specifications. Such a selection is made based on the particular prompt script specification for the type of response generated by the target phone number.

A locating operation 1012 identifies the mapping of each of the sequence of prompts using an IPF map file. Thus, the locating operation 1014 locates the offsets and/or duration of each prompts as identified in the IPF. A calling operation 1014 calls the target as identified by the target phone number. Subsequently, based on the response generated by the target phone number (live answer, answering machine, etc.), a playing operation 1016 plays each of the sequence of prompts as identified and located in operations 1010 and 1012.

Even though the operations of FIG. 10 are illustrated as being operative for an outbound call, in alternative implementation, one or more of such operations are also used for responding to an incoming call. Thus, for example, operations 1002 to 1012 are executed so that when an incoming call is received from one of the phone numbers on the target list, appropriate series of prompts are played in response to the incoming call.

In an alternative implementation, the playing operation 1016 also selects and plays one or more sound files to the target phone called in the calling operation 1014. Such sound files may be personalized sound files that are personalized based on one or more characteristic of the target. In one implementation, the sound files are in the form of WAV files, however, alternative format of sound files may also be used.

For example, in one implementation, the sound file is a personalized invitation sound file that invites the target to a live telephony event.

The playing operation may continue the telephone call with the target at the end of playing the personalized invitation sound file. In such a case, the target will be automatically joined to a live telephony event after listening to the personalized invitation sound file. In an alternative implementation, the playing operation 1016 plays a combination of one or more sound files and one or more prompts for inviting the target to a live telephony event. Specifically, the one or more of the sound files may be personalized sound files that are personalized based on one or more characteristics of the target whereas the one or more of the prompts may be selected based on the prompts located by the locating operation 1012.

Figure 11:
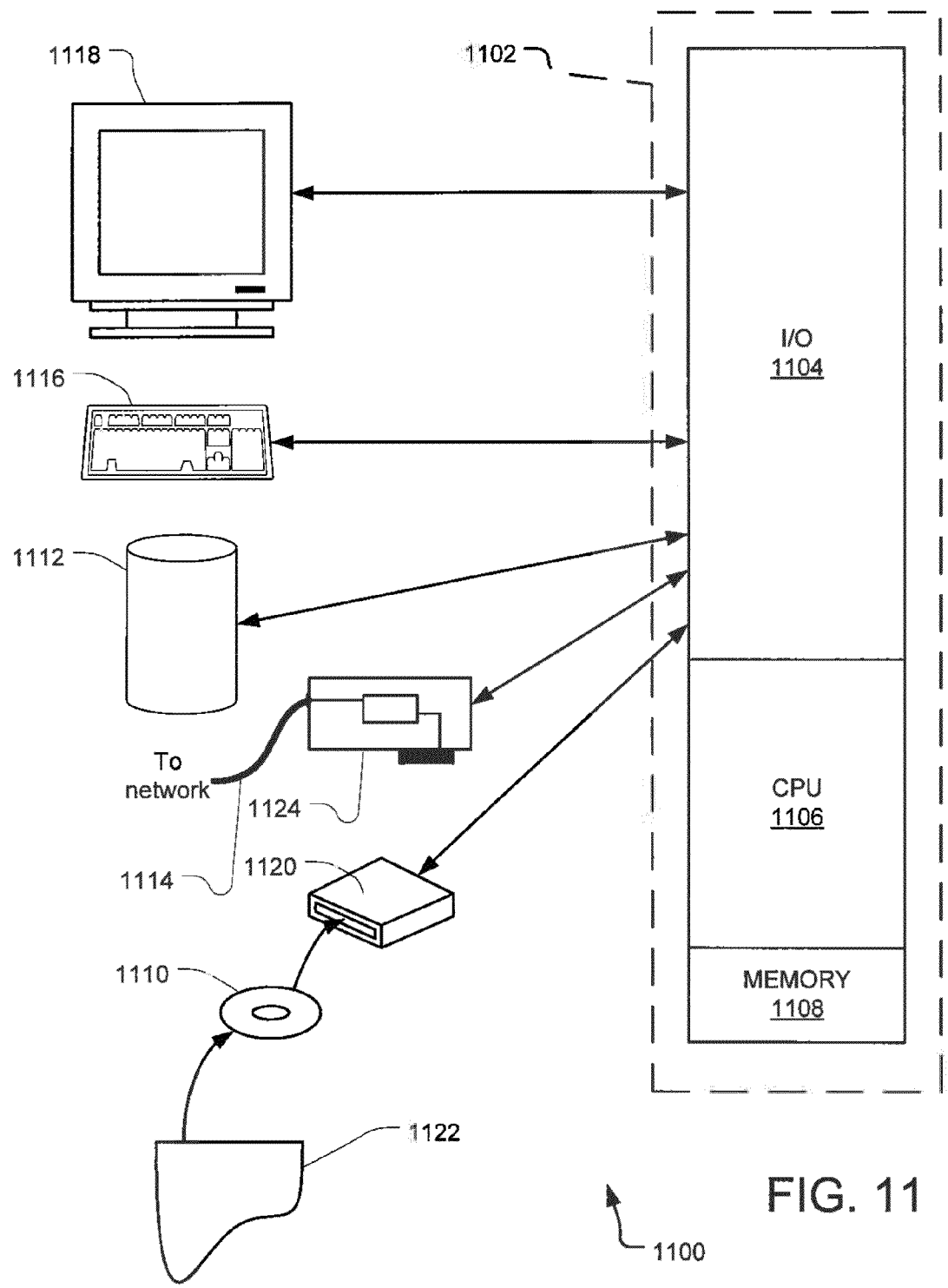
FIG. 11 illustrates an example computing system used to implement the technology described herein.

FIG. 11 illustrates an example computing system that can be used to implement the described technology. A general-purpose computer system 1100 is capable of executing a computer program product to execute a computer process. Data and program files may be input to the computer system 1100, which reads the files and executes the programs therein. Some of the elements of a general-purpose computer system 1100 are shown in FIG. 11 wherein a processor 1102 is shown having an input/output (I/O) section 1104, a Central Processing Unit (CPU) 1106, and a memory section 1108. There may be one or more processors 1102, such that the processor 1102 of the computer system 1100 comprises a single central-processing unit 1106, or a plurality of processing units, commonly referred to as a parallel processing environment. The computer system 1100 may be a conventional computer, a distributed computer, or any other type of computer. The described technology is optionally implemented in software devices loaded in memory 1108, stored on a configured DVD/CD-ROM 1110 or storage unit 1112, and/or communicated via a wired or wireless network link 1114 on a carrier signal, thereby transforming the computer system 1100 in FIG. 11 to a special purpose machine for implementing the described operations.

The I/O section 1104 is connected to one or more user-interface devices (e.g., a keyboard 1116 and a display unit 1118), a disk storage unit 1112, and a disk drive unit 1120. Generally, in contemporary systems, the disk drive unit 1120 is a DVD/CD-ROM drive unit capable of reading the DVD/CD-ROM medium 1110, which typically contains programs and data 1122. Computer program products containing mechanisms to effectuate the systems and methods in accordance with the described technology may reside in the memory section 1104, on a disk storage unit 1112, or on the DVD/CD-ROM medium 1110 of such a system 1100. Alternatively, a disk drive unit 1120 may be replaced or supplemented by a floppy drive unit, a tape drive unit, or other storage medium drive unit. The network adapter 1124 is capable of connecting the computer system to a network via the network link 1114, through which the computer system can receive instructions and data embodied in a carrier wave. Examples of such systems include Intel and PowerPC systems offered by Apple Computer, Inc., personal computers offered by Dell Corporation and by other manufacturers of Intel-compatible personal computers, AMD-based computing systems and other systems running a Windows-based, UNIX-based, or other operating system. It should be understood that computing systems may also embody devices such as Personal Digital Assistants (PDAs), mobile phones, gaming consoles, set top boxes, etc.

When used in a LAN-networking environment, the computer system 1100 is connected (by wired connection or wirelessly) to a local network through the network interface or adapter 1124, which is one type of communications device. When used in a WAN-networking environment, the computer system 1100 typically includes a modem, a network adapter, or any other type of communications device for establishing communications over the wide area network. In a networked environment, program modules depicted relative to the computer system 1100 or portions thereof, may be stored in a remote memory storage device. It is appreciated that the network connections shown are exemplary and other means of and communications devices for establishing a communications link between the computers may be used.

In an example implementation, the general-purpose computer system 1100 includes the outbound call generation system. Further, the plurality of internal and external databases, source database, and/or data cache on the cloud server are stored as memory 1108 or other storage systems, such as disk storage unit 1112 or DVD/CD-ROM medium 1110. Still further, some or all of the operations disclosed in FIGS. 1, 2, 3, and 10 are performed by the processor 1102. In addition, one or more of the GUIs 700 and 800 may be generated by the processor 1102 and a user may interact with these GUIs using one or more user-interface devices (e.g., a keyboard 1116 and a display unit 1118). Furthermore, one or more of the files 400, 500, 600 and 900 may be stored on the memory section 1108.

In the above description, for the purposes of explanation, numerous specific details are set forth in order to provide a thorough understanding of the technology described herein. The technology described herein may be practiced without some of these specific details. For example, while various features are ascribed to particular implementations, it should be appreciated that the features described with respect to one implementation may be incorporated with other implementations as well. Similarly, however, no single feature or features of any described implementation should be considered essential to the technology described herein, as other implementations of the technology described herein may omit such features.

In the interest of clarity, not all of the routine functions of the implementations described herein are shown and described. It will, be appreciated that in the development of any such actual implementation, numerous implementation-specific decisions must be made in order to achieve the developer's specific goals, such as compliance with application— and business-related constraints, and that those specific goals will vary from one implementation to another and from one developer to another.

According to one implementation of the technology described herein, the components, process steps, and/or data structures disclosed herein may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, connections and networks, data stores, or a stand-alone device. The process can be implemented as instructions executed by such hardware, hardware alone, or any combination thereof. The software may be stored on a program storage device readable by a machine.

According to one implementation of the technology described herein, the components, processes and/or data structures may be implemented using machine language, assembler, C or C++, Java and/or other high level language programs running on a data processing computer such as a personal computer, workstation computer, mainframe computer, or high performance server running an OS such as Solaris® available from Sun Microsystems, Inc. of Santa Clara, Calif., Windows Vista™, Windows NT®, Windows XP PRO, and Windows® 2000, available from Microsoft Corporation of Redmond, Wash., Apple OS X-based systems, available from Apple Inc. of Cupertino, Calif., or various versions of the Unix operating system such as Linux available from a number of vendors. The method may also be implemented on a multiple-processor system, or in a computing environment including various peripherals such as input devices, output devices, displays, pointing devices, memories, storage devices, media interfaces for transferring data to and from the processor(s), and the like. In addition, such a computer system or computing environment may be networked locally, or over the Internet or other networks. Different implementations may be used and may include other types of operating systems, computing platforms, computer programs, firmware, computer languages and/or general purpose machines; and. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

In the context of the technology described herein, the term "processor" describes a physical computer (either stand-alone or distributed) or a virtual machine (either stand-alone or distributed) that processes or transforms data. The processor may be implemented in hardware, software, firmware, or a combination thereof.

In the context of the technology described herein, the term "data store" describes a hardware and/or software means or apparatus, either local or distributed, for storing digital or analog information or data. The term "data store" describes, by way of example, any such devices as random access memory (RAM), read-only memory (ROM), dynamic random access memory (DRAM), static dynamic random access memory (SDRAM), Flash memory, hard drives, disk drives, floppy drives, tape drives, CD drives, DVD drives, magnetic tape devices (audio, visual, analog, digital, or a combination thereof), optical storage devices, electrically erasable programmable read-only memory (EEPROM), solid state memory devices and Universal Serial Bus (USB) storage devices, and the like. The term "Data store" also describes, by way of example, databases, file systems, record systems, object oriented databases, relational databases, SQL databases, audit trails and logs, program memory, cache and buffers, and the like.

The implementations of the technology described herein are implemented as logical steps in one or more computer systems. The logical operations of the technology described herein are implemented (1) as a sequence of processor-implemented steps executing in one or more computer systems and (2) as interconnected machine or circuit modules within one or more computer systems. The implementation is a matter of choice, dependent on the performance requirements of the computer system implementing the technology described herein. Accordingly, the logical operations making up the implementations of the technology described herein described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary implementations of the technology described herein. Since many implementations of the technology described herein can be made without departing from the spirit and scope of the technology described herein, the technology described herein resides in the claims hereinafter appended. Furthermore, structural features of the different implementations may be combined in yet another implementation without departing from the recited claims. The implementations described above and other implementations are within the scope of the following claims.

What is claimed is:

1. A method, comprising:
   generating a plurality of personalized prompts, each of the plurality of prompts related to one of a plurality of elements by:
   receiving parameters for at least one of a first name element and a last name element,
   analyzing the parameters for at least one of the first name element and the last name element to determine a predicted coverage percentage,
   selecting a subset of the parameters for at least one of the first name element and the last name element based on a threshold value for the predicted coverage percentage,
   recording a master sound file including one or more prompts related to the subset of parameters, and
   dividing the master sound file into the plurality of personalized prompts in the form of sound files;
   generating an indexed prompt file (IPF) comprising one or more of the plurality of personalized prompts;
   mapping one or more fields associated with a target phone number to one or more of the plurality of personalized prompts, wherein the one or more fields include individual information associated with the target phone number;
   generating a prompt script file, including one or more prompt script specifications, each of the one or more prompt script specifications including a list of rules for generating an outgoing message using one or more of the plurality of personalized prompts in the IPF file;
   generating a call to the target phone number; and
   based on the response to the call, selecting one of the prompt script specifications from the prompt script file to generate a personalized outgoing message.

2. The method of claim 1, wherein the IPF further comprises index information about the one or more of the plurality of personalized prompts.

3. The method of claim 1 wherein any and all prompts presented to a call recipient are played exclusively from within the IPF and no prompts are presented which are not part of the IPF.

4. The method of claim 1, further comprising:
   playing one or more of the plurality of personalized prompts.

5. The method of claim 1, wherein mapping the target phone number to the one or more of the plurality of personalized prompts further comprises mapping a target name related to the target phone number to the one or more of the plurality of personalized prompts using the homophone of the target name.

6. The method of claim 1, wherein selecting the subset of the parameters for the first name elements further comprises comparing one or more of the parameters for the first name elements with their homophones.

7. The method of claim 1, further comprising:
   generating an IPF map file mapping one or more of the plurality of elements to one or more of the plurality of personalized prompts; and deleting one or more of the plurality of personalized prompts after generating the IPF.

8. The method of claim 1, further comprising generating a compressed file including the IPF file and an IPF map file mapping one or more of the plurality of elements to one or more of the plurality of personalized prompts.

9. The method of claim 8, wherein generating the compressed file further comprises:
converting at least one of the plurality of personalized prompts into a pulse code modulated (PCM) format; and
normalizing the at least one of the plurality of personalized prompts.

10. The method of claim 9, wherein normalizing the at least one of the plurality of personalized prompts further comprises normalizing at least one of (1) volume of the at least one of the plurality of personalized prompts; (2) pitch of the at least one of the plurality of personalized prompts; and (3) background noise of the at least one of the plurality of personalized prompts.

11. The method of claim 1, wherein generating the prompt script file further comprises:
generating a plurality of map rule specifications, each of the plurality of map rule specifications including one or more pairs of elements and keys; and
generating one of more of the prompt script specifications including one or more of the map rule specifications.

12. The method of claim 1, wherein the one or more prompt script specifications includes a prompt script specification for a live answer, a prompt script specification for music hold, and a prompt script specification for answering machine.

13. The method of claim 12, wherein the one or more prompt script specifications includes a prompt script specification for a message to be played at the end of the call as a "goodbye" message.

14. The method of claim 12, wherein the one or more prompt script specifications includes a prompt script specification for a message to be played prompting the target for providing a feedback such as a voicemail message.

15. The method of claim 1, wherein the one or more of the plurality of elements are related to inviting the target to a live telephony event.

16. The method of claim 15, further comprising continuing the live telephony event with the target phone number after playing personalized prompts related to the one or more of the plurality of elements related to inviting the target to a live telephony event.

17. The method of claim 1, wherein the one or more of the plurality of personalized prompts are individualized for the target phone number based on the one or more fields associated with the target phone number.

18. The method of claim 1, wherein at least one of the one or more of the plurality of elements is an individualized survey for the target phone number.

19. The method of claim 1, wherein generating the call further comprises generating the call before initiation of a live telephony event.

20. The method of claim 1, wherein at least one of the one or more of the plurality of elements is an individualized ending message for a target, wherein the individualized ending message is played at the end of a live telephony event.

21. The method of claim 1, further comprising playing one or more sound files, wherein the one or more sound files are selected based on the individual information about the target.

22. The method of claim 21, wherein the one or more sound files are individualized invitation sound files inviting the target to a live telephony event.

23. The method of claim 22, further comprising continuing the live telephony event at the end of playing the one or more sound files.

24. The method of claim 1, wherein mapping the one or more fields associated with a target phone number to one or more of the plurality of personalized prompts further comprises mapping the one or more fields associated with a target phone number to one or more of the plurality of personalized prompts before initiating the call.

25. A system, comprising:
a computer processor; and
one or more non-transitory computer-readable storage media adapted to store one or more modules, the one or more modules comprising:
a recording module comprising one or more computer-executable instructions to allow a user to record a plurality of personalized prompts, each of the plurality of personalized prompts related to one of a plurality of elements by:
receiving parameters for at least one of a plurality of elements,
analyzing the parameters for at least one of the plurality of elements to determine a predicted coverage percentage,
selecting a subset of the parameters for at least one of the plurality of elements based on a threshold value for the predicted coverage percentage,
recording a master sound file including one or more prompts related to the subset of parameters, and
dividing the master sound file into the plurality of personalized prompts in the form of sound files,
an editing module comprising one or more computer-executable instructions to allow a user to generate an indexed prompt file (IPF) comprising one or more of the plurality of personalized prompts and index information about the one or more of the plurality of prompts,
a first generation module comprising one or more computer-executable instructions to automatically generate an IPF map file mapping one of the plurality of elements to one or more of the plurality of personalized prompts,
a second generation module comprising one or more computer-executable instructions to generate a prompt script file including one or more prompt script specifications, each of the one or more prompt script specifications including a list of rules for generating an outgoing message for one or more of a live answer, a music hold, and a an answering machine,
a first mapping module comprising one or more computer-executable instructions to map a target phone number to the one or more of the plurality of elements, the target phone number being associated with a target on a target list,
a second mapping module comprising one or more computer-executable instructions to map one or more fields associated with the target phone number with one or more of the plurality of personalized prompts, wherein the one or more fields include individual information about the target phone number,
a call generation module comprising one or more computer-executable instructions to generate a call to the target phone number, and
a message generation module comprising one or more computer-executable instructions to play the one or more of the plurality of personalized prompts,
wherein each of the recording module, the editing module, the first generation module, the second generation module, the first mapping module, the second mapping module, the call generation module, and the message generation module are configured to be executed on the computer processor.

26. One or more non-transitory computer-readable storage media encoding computer-executable instructions for executing a computing process on a computer system, the computing process comprising:

generating a plurality of personalized prompts, each of the plurality of personalized prompts related to one of a plurality of elements by:

receiving parameters for at least one of the plurality of elements, analyzing the parameters for at least one of the plurality of elements to determine a predicted coverage percentage, selecting a subset of the parameters for at least one of the plurality of elements based on a threshold value for the predicted coverage percentage, recording a master sound file including one or more prompts related to the subset of parameters, and dividing the master sound file into the plurality of personalized prompts in the form of sound files;

generating an indexed prompt file (IPF) comprising one or more of the plurality of personalized prompts, wherein the IPF further comprises index information about the one or more of the plurality of prompts;

generating an IPF map file mapping one or more of the elements to one or more of the plurality of personalized prompts;

mapping a target phone number to the one or more of the plurality of personalized prompts, the target phone number being associated with a target phone number;

mapping one or more fields associated with the target phone number to one or more of the plurality of elements, wherein the one or more fields include individual information about the target phone number;

generating a call to the target phone number; and based on the response to the call, selecting one of plurality of prompt script specifications, each of the one or more prompt script specifications including a list of rules for generating an outgoing message.

27. The one or more non-transitory computer-readable storage media of claim 26, wherein the computer process further comprising playing one or more sound files wherein the one or more sound files are individualized invitation files inviting the target to a live telephony event.

* * * * *